US012173952B2

United States Patent
Liang et al.

(10) Patent No.: US 12,173,952 B2
(45) Date of Patent: Dec. 24, 2024

(54) METHOD AND DEVICE FOR CONTROLLING A LOW-TEMPERATURE REFRIGERATION AIR VALVE

(71) Applicants: Hefei Midea Heating & Ventilating Equipment Co., Ltd., Anhui (CN); GD Midea Heating & Ventilating Equipment Co., Ltd., Foshan (CN)

(72) Inventors: Xin Liang, Hefei (CN); Guozhong Yang, Hefei (CN); Mingren Wang, Hefei (CN); Zhijun Tan, Hefei (CN)

(73) Assignees: HEFEI MIDEA HEATING & VENTILATING EQUIPMENT CO., LTD., Hefei (CN); GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 680 days.

(21) Appl. No.: 17/361,198

(22) Filed: Jun. 28, 2021

(65) Prior Publication Data

US 2021/0325101 A1 Oct. 21, 2021

Related U.S. Application Data

(63) Continuation of application No. PCT/CN2019/090145, filed on Jun. 5, 2019.

(30) Foreign Application Priority Data

Dec. 29, 2018 (CN) .......................... 201811641425.5

(51) Int. Cl.
F25D 17/06 (2006.01)
(52) U.S. Cl.
CPC ................................ F25D 17/062 (2013.01)

(58) Field of Classification Search
None
See application file for complete search history.

(56) References Cited

U.S. PATENT DOCUMENTS

| 12,038,192 B2 * | 7/2024 | Yang | F24F 11/30 |
| 2021/0325071 A1 * | 10/2021 | Yang | F24F 11/84 |
| 2021/0325101 A1 * | 10/2021 | Liang | F25D 17/045 |

FOREIGN PATENT DOCUMENTS

| CN | 103292421 A | 9/2013 |
| CN | 104949283 A * | 9/2015 |

(Continued)

OTHER PUBLICATIONS

CN-107152822-A English Machine Translation (Year: 2017).*

(Continued)

*Primary Examiner* — Jenna M Maroney
(74) *Attorney, Agent, or Firm* — Morgan, Lewis & Bockius LLP

(57) ABSTRACT

A method and a device for controlling a low-temperature refrigeration air valve, the method includes: acquiring a current environment temperature; according to the current environment temperature, determining an initial target pressure of the current system and an initial opening degree of an air valve; acquiring an actual pressure of the current system and a target pressure of the current system; and adjusting an opening degree of the air valve according to a difference value between the target pressure of the current system and the actual pressure of the current system, wherein the air valve is disposed at a low-temperature cover. An opening degree of the air valve is adjusted according to the difference value between the target pressure of the current system and the actual pressure of the current system, to meet the refrigeration demand of the user in an ultra-low temperature environment, expanding the operation scope of refrigeration.

4 Claims, 2 Drawing Sheets

(56) References Cited

FOREIGN PATENT DOCUMENTS

| CN | 105605747 A | * | 5/2016 | |
|---|---|---|---|---|
| CN | 105757890 A | | 7/2016 | |
| CN | 106052020 A | | 10/2016 | |
| CN | 107152822 A | * | 9/2017 | ............. F25B 49/02 |
| CN | 108917218 A | | 11/2018 | |
| CN | 109708273 A | | 5/2019 | |
| JP | 4711706 B2 | | 6/2011 | |
| WO | WO 2020133927 A1 | | 7/2020 | |

OTHER PUBLICATIONS

CN-105605747-A English Machine Translation (Year: 2016).*
CN-104949283-A English Machine Translation (Year: 2015).*
Hefei Midea HVAC Equipment Co., Ltd., International Search Report and Written Opinion, PCT/CN2019090145, Jun. 5, 2019, 12 pgs.
Midea Group Co., Ltd., CA Office Action, Canadian Patent Application No. 3,121,658, Sep. 12, 2022, 4 pgs.
Tencent Technology, First Chinese Office Action, CN Patent Application No. 201811641425.5, Oct. 9, 2019, 11 pgs.
Tencent Technology, Second Chinese Office Action, CN Patent Application No. 201811641425.5, Jun. 24, 2020, 12 pgs.
Tencent Technology, Third Chinese Office Action, CN Patent Application No. 201811641425.5, Mar. 8, 2021, 4 pgs.
Xi'an Jiaotong University Press, "Refrigeration Plant Automation", 2nd Edition, National Planning Textbook for General Higher Education in the Eleventh Five-Year Plan, Sep. 2019, 6 pgs.

* cited by examiner

METHOD AND DEVICE FOR CONTROLLING A LOW-TEMPERATURE REFRIGERATION AIR VALVE

CROSS-REFERENCE TO RELATED APPLICATIONS

This application is a continuation of PCT International Application No. PCT/CN 2019/090145, filed Jun. 5, 2019, which claims the benefit of Chinese Application No. 201811641425.5, filed on Dec. 29, 2018, filed with China National Intellectual Property Administration, and entitled "Method And Device For Controlling Low-Temperature Refrigeration Air Valve," each of which is incorporated herein by reference.

FIELD

This application relates to the technical field of air conditioning, in particular to a method and a device for controlling a low-temperature refrigeration air valve.

BACKGROUND

With the continuous increase of market demand, the cooling capacity at a low external environment temperature has attracted more and more attention from users. However, in the low external temperature environment, there is a large temperature difference between the condensation temperature of a condenser in an outdoor unit and the environment temperature, and a large amount of heat dissipation of the condenser, thereby may easily cause a series of problems, such as a low high-pressure and a low low-pressure in the system, liquid accumulation in a heat exchanger, difficulty in initiation of compressor or the like.

At present, related technologies include optimizing the controlling means of multi-line air conditioner, such as reducing the speed of a fan of the outdoor unit, turning off some of heat exchangers, switching some external heat exchangers from condensers to evaporators through design, controlling the opening degree of throttling components in the system or the like.

However, the following problem in the related technologies still exists: the convective heat exchange between the heat exchanger and the air still cannot match the requirements of the refrigeration load in an ultra-low temperature environment (for example, −15° C. or below), thus cannot meet the refrigeration demand.

SUMMARY

The present disclosure aims to solve one of the technical problems in the related art at least to a certain extent. For this, an object of the present disclosure is a method for controlling a low-temperature refrigeration air valve, which is capable of adjusting an opening degree of the air valve according to a difference value between the target pressure of the current system and the actual pressure of the current system, thereby meeting the refrigeration demand of the user in an ultra-low temperature environment and expanding the operation scope of refrigeration.

Another object of the present disclosure is a device for controlling a low-temperature refrigeration air valve.

For the foregoing objects, a first aspect of the present disclosure in embodiments includes a method for controlling a low-temperature refrigeration air valve, comprising:
acquiring a current environment temperature;
determining an initial target pressure of a current system and an initial opening degree of the air valve according to the current environment temperature;
acquiring an actual pressure of the current system and a target pressure of the current system; and
adjusting an opening degree of the air valve according to a difference value between the target pressure of the current system and the actual pressure of the current system,
wherein the air valve is disposed at a low-temperature cover.

According to the method for controlling a low-temperature refrigeration air valve in accordance with embodiments of the present disclosure, a current environment temperature is acquired, an initial target pressure of a current system and an initial opening degree of the air valve is determined according to the current environment temperature, an actual pressure of the current system and a target pressure of the current system is acquired, and thus an opening degree of the air valve is adjusted according to a difference value between the target pressure of the current system and the actual pressure of the current system, wherein the air valve is disposed at a low-temperature cover. Therefore, according to the method for controlling a low-temperature refrigeration air valve in accordance with some embodiments of the present disclosure, an opening degree of the air valve is adjusted according to a difference value between the target pressure of the current system and the actual pressure of the current system, so as to meet the refrigeration demand of the user in an ultra-low temperature environment and thus expands the operation scope of refrigeration.

In addition, the method for controlling a low-temperature refrigeration air valve according to the above embodiments of the present disclosure may also have the following additional technical features.

In some embodiments of the present disclosure, the actual pressure of the current system is a discharge pressure of a compressor or a condensing pressure of a condenser.

In some embodiments of the present disclosure, an adjustment extent of the opening degree of the air valve is determined based on the initial target pressure of the current system and the initial opening degree of the air valve.

In some embodiments of the present disclosure, acquiring a target pressure of the current system comprises:
acquiring the current environment temperature at intervals of a preset time period,
adjusting the target pressure of the current system according to the current environment temperature, and
acquiring an adjusted target pressure of the current system.

In some embodiments of the present disclosure, adjusting an opening degree of the air valve comprises:
adjusting the opening degree of the air valve according to an adjustment extent of the opening degree of the air valve,
wherein the adjustment extent of the opening degree of the air valve is obtained according to the following formula:

$$\Delta X = f(\Delta Xt) + g(\Delta P) + h(\Delta Pt),$$

wherein $\Delta Xt$ indicates an adjustment extent of the opening degree of the air valve for a previous time period t, $\Delta P$ indicates a difference value between the actual pressure of the current system and the target pressure of the current system at a current time, and $\Delta Pt$ indicates a difference value between the actual pressure of the current system and the target pressure of the current system for the previous time period t.

In some embodiments of the present disclosure, $$f(\Delta Xt)=f0+f1*\Delta Xt+f2*\Delta Xt^2+\ldots+fn*\Delta Xt^n;$$

$$g(\Delta P)=g0+g1*\Delta P+g2*\Delta P^2+\ldots+gn*\Delta P^n;$$

$$h(\Delta Pt)=h0+h1*\Delta Pt+h2*\Delta Pt^2+\ldots+hn*\Delta Pt^n,$$

wherein f0 to fn, g0 to gn and h0 to hn are preset coefficients.

For the foregoing objects, a second aspect of the present disclosure in embodiments includes a device for controlling a low-temperature refrigeration air valve, comprising:

a first acquiring module, configured to acquire a current environment temperature;

a determining module, configured to determine an initial target pressure of a current system and an initial opening degree of the air valve according to the current environment temperature;

a second acquiring module, configured to acquire an actual pressure of the current system and a target pressure of the current system; and an adjusting module, configured to adjust an opening degree of the air valve according to a difference value between the target pressure of the current system and the actual pressure of the current system, wherein the air valve is disposed at a low-temperature cover.

According to the device for controlling a low-temperature refrigeration air valve in accordance with some embodiments of the present disclosure, a current environment temperature is acquired through a first acquiring module, an initial target pressure of a current system and an initial opening degree of the air valve is determined through a determining module according to the current environment temperature, an actual pressure of the current system and a target pressure of the current system is acquired through a second acquiring module, and thus an opening degree of the air valve is adjusted through an adjusting module according to a difference value between the target pressure of the current system and the actual pressure of the current system. Therefore, according to the device for controlling a low-temperature refrigeration air valve in accordance with some embodiments of the present disclosure, an opening degree of the air valve is adjusted according to a difference value between the target pressure of the current system and the actual pressure of the current system, so as to meet the refrigeration demand of the user in an ultra-low temperature environment and thus expands the operation scope of refrigeration.

In addition, the device for controlling a low-temperature refrigeration air valve according to the above embodiments of the present disclosure may also have the following additional technical features.

In some embodiments of the present disclosure, the actual pressure of the current system is a discharge pressure of a compressor or a condensing pressure of a condenser.

In some embodiments of the present disclosure, the determining module is further configured to determine an adjustment extent of the opening degree of the air valve based on the initial target pressure of the current system and the initial opening degree of the air valve.

In some embodiments of the present disclosure, acquiring a target pressure of the current system comprises that:

the first acquiring module is further configured to acquire the current environment temperature at intervals of a preset time period, the determining module is further configured to adjust the target pressure of the current system according to the current environment temperature, the second acquiring module is further configured to acquire an adjusted target pressure of the current system.

In some embodiments of the present disclosure, adjusting an opening degree of the air valve comprises that:

the adjusting module is further configured to adjust the opening degree of the air valve according to an adjustment extent of the opening degree of the air valve, wherein the adjustment extent of the opening degree of the air valve is obtained according to the following formula:

$$\Delta X=f(\Delta Xt)+g(\Delta P)+h(\Delta Pt),$$

wherein $\Delta Xt$ indicates an adjustment extent of the opening degree of the air valve for a previous time period t, $\Delta P$ indicates a difference value between the actual pressure of the current system and the target pressure of the current system at a current time, and $\Delta Pt$ indicates a difference value between the actual pressure of the current system and the target pressure of the current system for the previous time period t.

In some embodiments of the present disclosure, $$f(\Delta Xt)=f0+f1*\Delta Xt+f2*\Delta Xt^2+\ldots+fn*\Delta Xt^n;$$

$$g(\Delta P)=g0+g1*\Delta P+g2*\Delta P^2+\ldots+gn*\Delta P^n;$$

$$h(\Delta Pt)=h0+h1*\Delta Pt+h2*\Delta Pt^2+\ldots+hn*\Delta Pt^n,$$

wherein f0 to fn, g0 to gn and h0 to hn are preset coefficients.

The additional aspects and advantages of the present disclosure will be partially given in the following description, and some will become apparent from the following description or be understood through the practice of the present disclosure.

DETAILED DESCRIPTION

Figure 1:
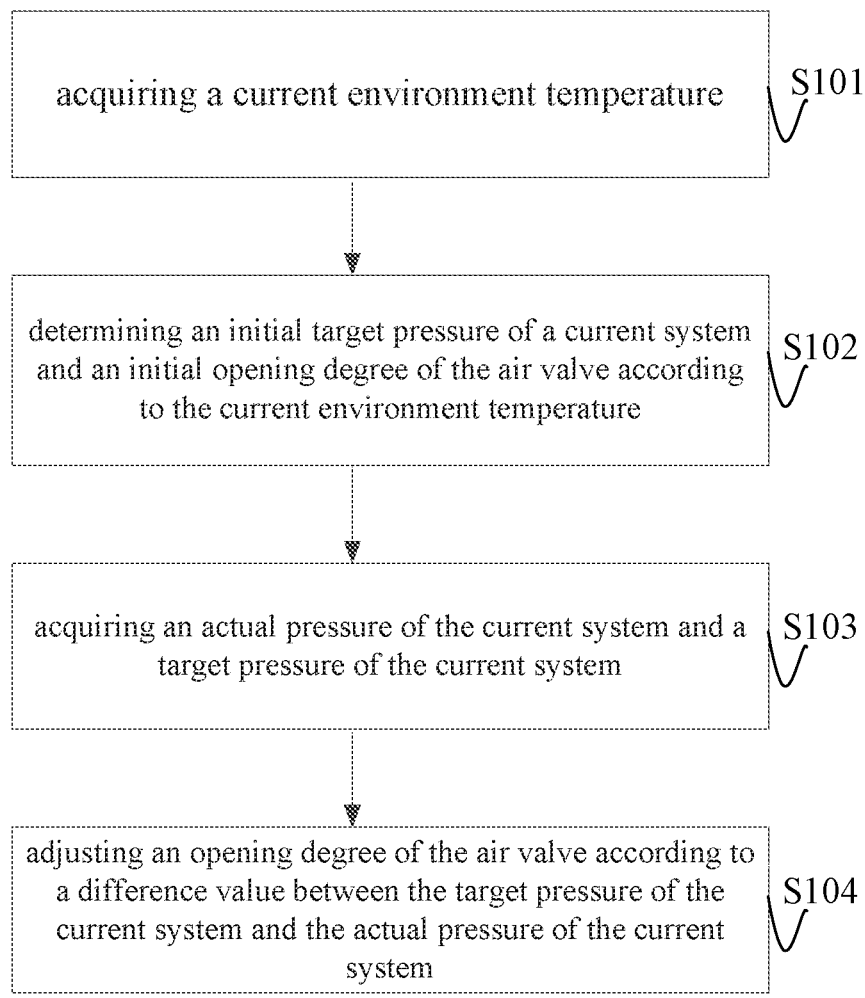
FIG. 1 is a flow chart of a method for controlling a low-temperature refrigeration air valve according to embodiments of the present disclosure.

The embodiments of the present disclosure are described in detail below. Examples of the embodiments are shown in the drawings, in which the same or similar reference numerals indicate the same or similar elements or elements with the same or similar functions. The embodiments described below with reference to the drawings are exemplary and are intended to explain the present disclosure, which should not be construed as limiting the present disclosure.

The method and device for controlling a low-temperature refrigeration air valve according to embodiments of the present disclosure are described below with reference to the drawings.

FIG. 1 is a flow chart of a method for controlling a low-temperature refrigeration air valve according to embodiments of the present disclosure.

Referring to FIG. 1, the method for controlling a low-temperature refrigeration air valve includes the followings.

S101, acquiring a current environment temperature.

Optionally, in a refrigeration system, a temperature sensor can be disposed at an outdoor unit to acquire the current environment temperature Ts.

S102, determining an initial target pressure of a current system and an initial opening degree of the air valve according to the current environment temperature.

Specifically, according to some embodiments of the present disclosure, an adjustment extent $\Delta X$ of the opening degree of the air valve is determined based on the initial target pressure Pc of the current system and the initial opening degree Kc of the air valve.

S103, acquiring an actual pressure of the current system and a target pressure of the current system.

Figure 3:
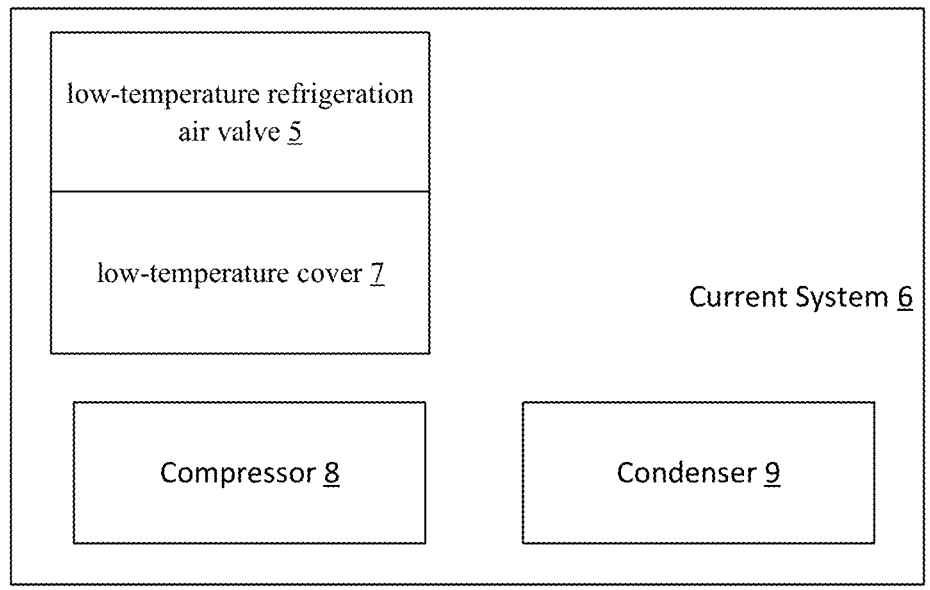
FIG. 3 is a block diagram of a current system that includes a low-temperature refrigeration air valve according to embodiments of the present disclosure.

Specifically, according to some embodiments of the present disclosure, the actual pressure Ps of the current system may be a discharge pressure of a compressor 8 (FIG. 3) or a condensing pressure of a condenser 9 (FIG. 3).

It should be noted that a pressure sensor may be set at any position between an outlet of the compressor and an external heat exchanger in the refrigeration system to acquire the actual pressure Ps of the current system.

Further, according to some embodiments of the present disclosure, acquiring a target pressure Ps of the current system includes:

acquiring the current environment temperature Ts at intervals of a preset time period t, adjusting the target pressure Pm of the current system according to the current environment temperature Ts, and acquiring an adjusted target pressure Pm of the current system.

That is, at each interval of a preset time period t, the current environment temperature Ts is acquired, and the target pressure Pm of the current system is adjusted according to the current environment temperature Ts, thus acquiring an adjusted target pressure Pm of the current system so as to determine an adjustment extent $\Delta X$ of the opening degree of the air valve.

S104, adjusting an opening degree of the air valve according to a difference value between the target pressure of the current system and the actual pressure of the current system.

That is, the method for controlling a low-temperature refrigeration air valve according to embodiments of the present disclosure is capable of adjusting an opening degree of the air valve according to a difference value between the target pressure of the current system and the actual pressure of the current system, so as to meet the refrigeration demand of the user in an ultra-low temperature environment and thus expands the operation scope of refrigeration.

Specifically, according to some embodiments of the present disclosure, adjusting an opening degree of the air valve includes:

adjusting the opening degree K of the air valve according to an adjustment extent $\Delta X$ of the opening degree of the air valve, wherein the adjustment extent $\Delta X$ of the opening degree of the air valve is obtained according to the following formula:

$$\Delta X = f(\Delta Xt) + g(\Delta P) + h(\Delta Pt),$$

wherein $\Delta Xt$ indicates an adjustment extent of the opening degree of the air valve for a previous time period t, $\Delta P$ indicates a difference value between the actual pressure of the current system and the target pressure of the current system at a current time, and $\Delta Pt$ indicates a difference value between the actual pressure of the current system and the target pressure of the current system for the previous time period t.

Further, according to some embodiments of the present disclosure, $$f(\Delta Xt) = f0 + f1*\Delta Xt + f2*\Delta Xt^2 + \ldots + fn*\Delta Xt^n;$$

$$g(\Delta P) = g0 + g1*\Delta P + g2*\Delta P^2 + \ldots + gn*\Delta P^n;$$

$$h(\Delta Pt) = h0 + h1*\Delta Pt + h2*\Delta Pt^2 + \ldots + gn*\Delta Pt^b,$$

wherein f0 to fn, g0 to gn and h0 to hn are preset coefficients.

For example, when the refrigeration system is turned on and running, a current environment temperature Ts is acquired, and an initial target pressure Pc of the current system and an initial opening degree Kc of the air valve are determined according to the current environment temperature Ts for subsequent determining an adjustment extent $\Delta X$ of the opening degree of the air valve. During the operation of the refrigeration system, at intervals of a preset time period t (such as 20 seconds), the actual pressure Ps of the current system is acquired, and the current environment temperature Ts is acquired again for adjusting the target pressure Pm of the current system, thus acquiring a difference value $\Delta P$ between the actual pressure Pc of the current system and the adjusted target pressure Pm of the current system, that is, $\Delta P = Pm - Ps$. The adjustment extent $\Delta X$ of the opening degree of the air valve is determined based on an target pressure Pc of the current system and the initial opening degree Kc of the air valve, according to the following formula: $\Delta X = f(\Delta Xt) + g(\Delta P) + h(\Delta Pt)$. Further, the opening degree K of the air valve is adjusted according to the adjustment extent $\Delta X$ of the opening degree of the air valve.

Above all, according to the method for controlling a low-temperature refrigeration air valve in accordance with embodiments of the present disclosure, a current environment temperature is acquired, an initial target pressure of a current system and an initial opening degree of the air valve is determined according to the current environment temperature, an actual pressure of the current system and a target pressure of the current system is acquired, and thus an opening degree of the air valve is adjusted according to a difference value between the target pressure of the current system and the actual pressure of the current system, in which the air valve is disposed at a low-temperature cover. Therefore, according to the method for controlling a low-temperature refrigeration air valve in accordance with some embodiments of the present disclosure, an opening degree of the air valve is adjusted according to a difference value between the target pressure of the current system and the actual pressure of the current system, so as to meet the refrigeration demand of the user in an ultra-low temperature environment and thus expands the operation scope of refrigeration.

Figure 2:
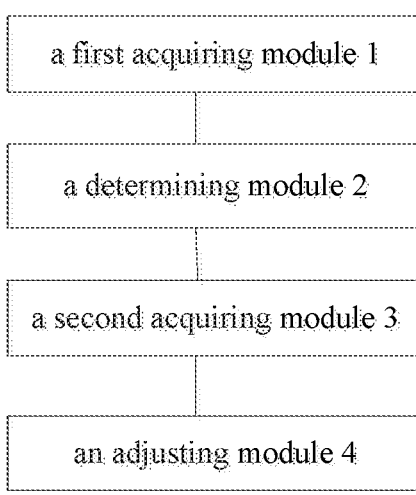
FIG. 2 is a block diagram of a device for controlling a low-temperature refrigeration air valve according to embodiments of the present disclosure.

FIG. 2 is a block diagram of a device for controlling a low-temperature refrigeration air valve according to embodiments of the present disclosure.

Referring to FIG. 2 and FIG. 3, the device 100 for controlling a low-temperature refrigeration air valve 5 includes a first acquiring module 1, a determining module 2, a second acquiring module 3 and an adjusting module 4.

Specifically, the first acquiring module 1 is configured to acquire a current environment temperature; the determining module 2 is configured to determine an initial target pressure of a current system 6 and an initial opening degree of the air valve 5 according to the current environment temperature; the second acquiring module 3 is configured to acquire an actual pressure of the current system 6 and a target pressure of the current system 6; and an adjusting module 4 is configured to adjust an opening degree of the air valve 5 according to a difference value between the target pressure of the current system 6 and the actual pressure of the current system 6, in which the air valve 5 is disposed at a low-temperature cover 7.

Optionally, in a refrigeration system, the first acquiring module 1 such as a temperature sensor can be disposed at an outdoor unit to acquire the current environment temperature. Further, the second acquiring module 3 such as a pressure sensor can be set at any position between an outlet of the compressor 8 and an external heat exchanger in the refrigeration system to acquire the actual pressure Ps of the current system.

Further, according to some embodiments of the present disclosure, the determining module 2 is further configured to determine an adjustment extent of the opening degree of the air valve based on the initial target pressure of the current system and the initial opening degree of the air valve.

That is, after determining an initial target pressure of a current system and an initial opening degree of the air valve according to the current environment temperature, the determining module 2 is further configured to determine an adjustment extent of the opening degree of the air valve based on the initial target pressure of the current system and the initial opening degree of the air valve.

Further, according to some embodiments of the present disclosure, the actual pressure of the current system is a discharge pressure of a compressor or a condensing pressure of a condenser.

It should be noted that the actual pressure of the current system can also be the pressure at any position between an outlet of the compressor and an external heat exchanger in the refrigeration system as described above.

Further, according to some embodiments of the present disclosure, the first acquiring module 1 is further configured to acquire the current environment temperature at intervals of a preset time period; the determining module 2 is further configured to adjust the target pressure of the current system according to the current environment temperature; the second acquiring module 3 is further configured to acquire an adjusted target pressure of the current system.

That is, after the first acquiring module 1 acquires the current environment temperature at intervals of a preset time period, the determining module 2 further adjusts the target pressure of the current system according to the current environment temperature and thus the second acquiring module 3 acquires an adjusted target pressure of the current system.

Further, according to some embodiments of the present disclosure, the adjusting module 4 is further configured to adjust the opening degree of the air valve according to an adjustment extent of the opening degree of the air valve, in which the adjustment extent of the opening degree of the air valve is obtained according to the following formula:

$$\Delta X = f(\Delta Xt) + g(\Delta P) + h(\Delta Pt),$$

in which $\Delta Xt$ indicates an adjustment extent of the opening degree of the air valve for a previous time period t, $\Delta P$ indicates a difference value between the actual pressure of the current system and the target pressure of the current system at a current time, and $\Delta Pt$ indicates a difference value between the actual pressure of the current system and the target pressure of the current system for the previous time period t.

Specifically, according to some embodiments of the present disclosure, $$f(\Delta Xt) = f0 + f1*\Delta Xt + f2*\Delta Xt^2 + \ldots + fn*\Delta Xt^n;$$

$$g)\Delta P) = g0 + g1*\Delta P + g2*\Delta P^2 + \ldots + gn*\Delta P^n;$$

$$h(\Delta Pt) = h0 + h1*\Delta Pt + h2*\Delta Pt^2 + \ldots + hn*\Delta Pt^n,$$

in which f0 to fn, g0 to gn and h0 to hn are preset coefficients.

Above all, according to the device for controlling a low-temperature refrigeration air valve in accordance with some embodiments of the present disclosure, a current environment temperature is acquired through a first acquiring module, an initial target pressure of a current system and an initial opening degree of the air valve is determined through a determining module according to the current environment temperature, an actual pressure of the current system and a target pressure of the current system is acquired through a second acquiring module, and an opening degree of the air valve is adjusted through an adjusting module according to a difference value between the target pressure of the current system and the actual pressure of the current system. Therefore, according to the device for controlling a low-temperature refrigeration air valve in accordance with some embodiments of the present disclosure, an opening degree of the air valve is adjusted according to a difference value between the target pressure of the current system and the actual pressure of the current system, so as to meet the refrigeration demand of the user in an ultra-low temperature environment and thus expands the operation scope of refrigeration.

It should be noted that the logic and/or steps represented in the flow chart or described herein in other ways, for example, can be regarded as a sequence table of executable instructions for realizing logic functions, and can be implemented in any computer-readable medium, for use by an instruction execution system, equipment or device (such as a computer-based system, a system including a processor, or other systems that can fetch instructions from the instruction execution system, equipment or device and execute the instructions), or for use by a combination of the instruction execution system, equipment or device. In this specification, the "computer-readable medium" can be any device that can contain, store, communicate, propagate, or transmit a program for use by an instruction execution system, equipment or device or for use by a combination of the instruction execution system, equipment or device. More specific examples (non-exhaustive list) of the computer-readable medium include the following: an electrical connection (electronic device) with one or more wirings, a portable computer disk case (magnetic device), Random access memory (RAM), Read-only memory (ROM), erasable and editable read-only memory (EPROM or flash memory), a fiber optic device, and portable compact disk read-only memory (CDROM). In addition, the computer-readable medium may even be a paper or other suitable medium on which the program can be printed, because the program can be obtained electronically, for example, by optically scanning the paper or other medium, and then editing, interpreting, or other suitable processing ways if necessary, which is then stored in the computer memory.

It should be understood that each part of the present disclosure can be implemented by hardware, software, firmware, or a combination thereof. In the above embodiments, multiple steps or methods can be implemented by software or firmware stored in a memory and executed by a suitable instruction execution system. For example, if it is implemented by hardware as in another embodiment, it can be implemented by any one or a combination of the following technologies known in the art: discrete logic circuits with a logic gate circuit realizing logic functions for data signals, specific integrated circuits with suitable combined logic gate circuits, programmable gate array (PGA), field programmable gate array (FPGA), or the like.

In the description of this specification, descriptions with reference to the terms "one embodiment", "some embodiments", "examples", "specific examples" or "some examples" and the like mean that specific features, structures, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics can be combined in any one or more embodiments or examples in a suitable manner.

In the description of the present disclosure, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" "axial", "radial", "circumferential" and the like indicate the orientation or positional relationship is that shown in the drawings, and is only for the convenience of describing the present disclosure and simplifying the description, rather than indicating or implying the pointed device or element has to have a specific orientation, and be constructed and operated in a specific orientation, and therefore cannot be understood as a limitation of the present disclosure.

In addition, the terms "first" and "second" are only used for descriptive purposes and cannot be understood as indicating or implying relative importance or implicitly indicating the number of indicated technical features. Therefore, the features defined with "first" and "second" may explicitly or implicitly include at least one of the features. In the description of the present disclosure, the "plurality" means at least two such as two, three and the like, unless otherwise specifically defined.

In the present disclosure, the terms "disposed", "arranged", "connected", "fixed" and the like should be understood broadly, and may be either a fixed connection or a detachable connection, or an integration; may be a mechanical connection, or an electrical connection; may be directly connected, or connected via an intermediate medium; and may be the internal communication of two elements or the interaction of two elements, unless otherwise explicitly stated and defined. For those skilled in the art, the specific meanings of the above terms in the present disclosure can be understood according to specific situations.

In the present disclosure, a first feature "on" or "under" a second feature may refer to a direct contact of the first feature with the second feature or an indirect contact of the first feature and the second feature via an intermediate medium, unless otherwise explicitly stated and defined. Moreover, a first feature "above" a second feature may mean the first feature is right above or obliquely above the second feature, or merely that the first feature is located at a level higher than the second feature. A first feature "below" a second feature may mean the first feature is just below or obliquely below the second feature, or merely that the first feature is located at a level lower than the second feature.

Reference throughout this specification to "an embodiment", "one embodiment", "some embodiments", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in an example", "in a specific example" or "in some examples" in various places throughout this specification are not necessarily referring to the same embodiment or example of the present disclosure. Furthermore, various embodiments or examples as well as features of the various embodiments or examples described in the description, may be combined by those skilled in the art without contradiction.

Although explanatory embodiments have been shown and described, it would be appreciated that the above embodiments are exemplary which cannot be construed to limit the present disclosure, and changes, alternatives, substitution and modifications can be made in the embodiments by those skilled in the art without departing from scope of the present disclosure.

What is claimed is:

1. A device for controlling a low-temperature refrigeration air valve, comprising:
    a first acquiring module, configured to acquire a current environment temperature;
    a determining module, configured to determine an initial target pressure of a current system and an initial opening degree of the air valve according to the current environment temperature;
    a second acquiring module, configured to acquire an actual pressure of the current system and a target pressure of the current system; and
    an adjusting module, configured to adjust an opening degree of the air valve according to a difference value between the target pressure of the current system and the actual pressure of the current system,
    wherein the air valve is disposed at a low-temperature cover,
    wherein the determining module is further configured to determine an adjustment extent of the opening degree of the air valve based on the initial target pressure of the current system and the initial opening degree of the air valve,
    wherein the first acquiring module is configured to acquire the current environment temperature at intervals of a preset time period,
    the determining module is configured to adjust the target pressure of the current system according to the current environment temperature, and
    the second acquiring module is configured to acquire an adjusted target pressure of the current system.

2. The device for controlling a low-temperature refrigeration air valve according to claim 1, wherein the actual pressure of the current system is a discharge pressure of a compressor or a condensing pressure of a condenser.

3. The device for controlling a low-temperature refrigeration air valve according to claim 1, wherein the adjusting module is configured to adjust the opening degree of the air valve according to an adjustment extent of the opening degree of the air valve, wherein the adjustment extent of the opening degree of the air valve is obtained according to:

$\Delta X = f(\Delta Xt) + g(\Delta P) + h(\Delta Pt)$, wherein $\Delta Xt$ indicates an adjustment extent of the opening degree of the air valve for a previous time period t, $\Delta P$ indicates a difference value between the actual pressure of the current system and the target pressure of the current system at a current time, and $\Delta Pt$ indicates a difference value between the actual pressure of the current system and the target pressure of the current system for the previous time period t.

4. The device for controlling a low-temperature refrigeration air valve according to claim 3, wherein $f(\Delta Xt) = f0 + f1*\Delta Xt + f2*\Delta Xt\char`\^2 + \ldots + fn*\Delta Xt\char`\^n;$ $g)\Delta P) = g0 + g1*\Delta P + g2*\Delta P\char`\^ + \ldots + gn*\Delta P\char`\^n;$ $h(\Delta Pt) = h0 + h1*\Delta Pt + h2*\Delta Pt\char`\^2 + \ldots + hn*\Delta Pt\char`\^n,$ in which f0 to fn, g0 to gn and h0 to hn are preset coefficients.

\* \* \* \* \*